United States Patent [19]

Dodge

[11] Patent Number: 4,660,154

[45] Date of Patent: Apr. 21, 1987

[54] VARIABLE SIZE AND POSITION DIALOG AREA DISPLAY SYSTEM

[75] Inventor: Warren L. Dodge, Portland, Oreg.

[73] Assignee: Tektronix, Inc., Beaverton, Oreg.

[21] Appl. No.: 597,782

[22] Filed: Apr. 6, 1984

[51] Int. Cl.[4] .......................... G06F 3/14; G09G 1/16

[52] U.S. Cl. .................................... 364/518; 340/720; 364/900

[58] Field of Search ................ 364/518, 521; 340/744, 340/747, 709, 720, 723

[56] References Cited

U.S. PATENT DOCUMENTS

| | | | |
|---|---|---|---|
| 4,401,985 | 8/1983 | McVey et al. | 340/744 X |
| 4,433,377 | 2/1984 | Eustis et al. | 364/200 |
| 4,435,703 | 3/1984 | Hunt et al. | 340/723 |
| 4,446,457 | 5/1984 | Alexander | 340/745 |
| 4,454,507 | 6/1984 | Srinivasan et al. | 340/744 |
| 4,483,002 | 11/1984 | Groom, Jr. et al. | 371/29 |
| 4,484,302 | 11/1984 | Cason et al. | 364/900 |
| 4,542,376 | 9/1985 | Bass et al. | 364/518 X |

*Primary Examiner*—Felix D. Gruber
*Assistant Examiner*—H. R. Herndon
*Attorney, Agent, or Firm*—John P. Dellett; Robert S. Hulse

[57] ABSTRACT

A variable size and position dialog area or alphanumeric area is provided for the screen of a computer terminal in response to a single line of data from a data bus, containing the numerical indication of the initial line of a plurality of lines of alphanumeric information to be displayed and the numerical indication of the last line of a plurality of lines of alphanumeric information to be displayed. The numerical indications are successively loaded to a state machine operating as a counter which disables the alphanumeric display during a first counting operation and enables the alphanumeric display for the duration of a second counting operation.

11 Claims, 8 Drawing Figures

VARIABLE SIZE AND POSITION DIALOG AREA DISPLAY SYSTEM

BACKGROUND OF THE INVENTION

The present invention relates to computer terminals and particularly to a method and apparatus for variably positioning and blanking alphanumeric information on the display of a computer terminal.

In computer generated displays, especially those for portraying both graphic and alphanumeric information, it is desirable to selectively position or blank part of the alphanumeric information, as normally provided, so as not to obscure the graphics on the same screen. Then, on call, the alphanumeric information can be re-displayed for the purpose of communicating with the host computer.

The management of this alphanumeric information can consume an inordinate amount of time, requiring additional firmware and memory space for providing identification relative to character rows it is desired to blank or move. With computer terminals operating at high communications rates, it would be desirable to select certain lines of alphanumeric information for display with the least amount of interference with the normal functions of the terminal.

SUMMARY OF THE INVENTION

In accordance with the present invention in a preferred embodiment thereof, an input for positioning and blanking alphanumeric information on a computer terminal comprises one data word, including a first plurality of bits for indicating the position of the top line of alphanumeric information to be displayed, and a second group of bits for indicating the bottom line of the alphanumeric information to be displayed. In particular, the top bits indicate the number of lines which will occur before the alphanumeric display turns on, and the aforesaid bottom bits indicate how many lines are portrayed before the dispaly turns off. A first state machine, termed a clocks state machine or a clocks programmable array logic means, is responsive to synchronization of the terminal's video display for clocking a second state machine, or window programmable array logic means, for counting through the number of lines which are inhibited on the display. The second state machine then counts through the number of lines which are enabled before the screen is again blanked, providing an intervening, selectably positionable number of lines of alphanumeric data that can be viewed by the operator.

It is accordingly an object of the present invention to provide an improved method and means for selectively portraying lines of alphanumeric information on a video display.

It is another object of the present invention to provide a method and apparatus for selectively enabling the portrayal of lines of alphanumeric information on a display with a minimum of communication and management by the system software or firmware.

It is a further object of the present invention to provide an improved method and apparatus for directing the portrayal of alphanumeric information on a computer terminal with the minimum of interference with communication between the computer terminal and its host computer.

The subject matter of the present invention is particularily pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DRAWINGS

FIG. 1 is a block diagram of a system for controlling the portrayal of alphanumeric information according to the present invention.

FIG. 2 is a waveform chart for illustrating the portion of a video waveform, between vertical sync pulses, during which the FIG. 1 apparatus operates to control the presentation of lines of alphanumeric information, FIG. 3 is a schematic illustration of plural lines of alphanumeric information on a display, FIG. 4 is a schematic portrayal of one character on a line of alphanumeric information in a display, FIG. 5 is a waveform chart illustrating the generation of a clock input to a window state machine in the FIG. 1 apparatus, FIG. 6 is a schematic diagram of a portion of a programmable array logic circuit employed in the present invention.

FIG. 7 is a state diagram illustrating operation of the window programmable array logic circuit in FIG. 1, and FIG. 8 is a state diagram for a portion of the clocks programmable array logic circuit in FIG. 1.

DETAILED DESCRIPTION

Figure 1:
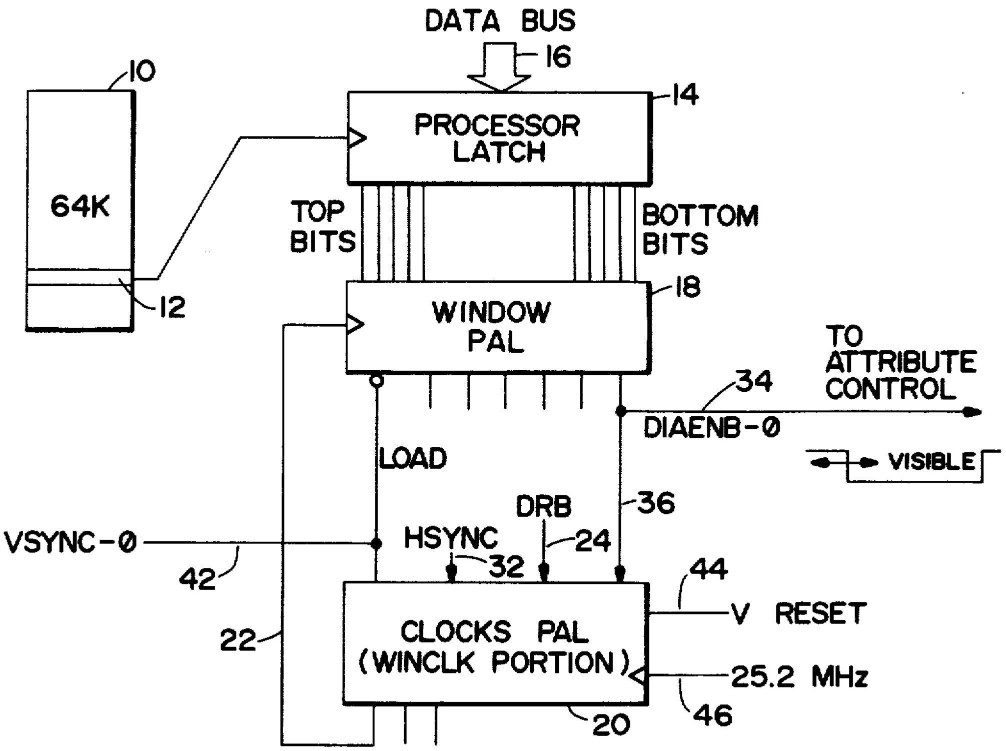

Referring to FIG. 1, illustrating a system according to the present invention in block diagram form, 64K bytes of IO space for the computer terminal to which the present system pertains are illustrated at 10, wherein an address 12 may be generated for clocking latch 14 coupled to the data bus 16 associated with the terminal. The data word addressed includes five "top bits", the purpose of which is to indicate how many lines of alphanumeric data occur before the terminal display is turned on, and five "bottom bits" the purpose of which is to indicate how many lines of visible alphanumeric information occur before the display is turned off. These bits of information are selectively provided to a "window" PAL (Programmable Array Logic Circuit) or state machine 18. The window PAL 18 is clocked from a clocks PAL (or rather a WINCLK portion thereof) on line 22. The clocks PAL 20 essentially provides one clock on line 22 for each DRB (data row boundary) input and causes the window PAL 18 to change to a different state. The data row boundary or DRB input at 24 is provided from conventional circuitry of the terminal display and is coincident with the time of starting of each alphanumeric row of information that could be displayed on the terminal. Thus, the data row boundary or DRB input may comprise a divided down horizontal sync signal from the computer terminal, or is otherwise conventionally derived by means well understood by those skilled in the art.

Figure 4:
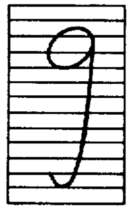

The "cell" for an alphanumeric presentation of a letter or other character is indicated in FIG. 4 and is divided into fifteen horizontal lines, any one of which may present a number of "pixels", according to the presence or absence of a portion of an alphanumeric character. The alphanumeric characters acorss the screen of the display are generated by fifteen (or less) consecutive horizontal scan lines, and approximately one fifteenth of each character may be generated for each of these scan lines.

Figure 3:
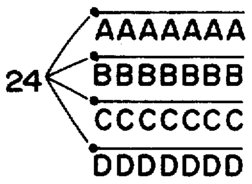
Figure 5:
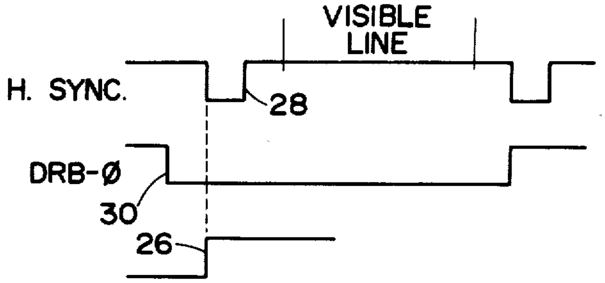

According to FIG. 3, a plurality of character lines are indicated by the letters A, B, C, and D respectively, and the occurence of DRB or the data row boundary signal is indicated by reference numeral 24. This signal will ordinarily occur at the start of a line. Assuming the character lines are each divided into fifteen parts as was illustrated in FIG. 4, there will be fifteen horizontal sync signals for each occurence of DRB. Referring to FIG. 5, the generation of the clocking signal on line 22 is indicated at 26 and occurs at the coincidence of the first horizontal sync pulse 28 after DRB commences at 30.

The clocks PAL 20 receives DRB on lead 24, receives the horizontal sync signal from the terminal display on lead 32, and generates the clocking signal for window PAL 18 on lead 22. The output of the FIG. 1 system is indicated as DIAENB-0 (or dialog enable) an output lead 34 from window PAL 18. This signal is also supplied to clocks PAL 20 on lead 36 for the detection of turnoff of dialog enable. When the clocks PAL 20 detects the cessation of output, no further clocks are presented to the window PAL on lead 22.

Figure 2:
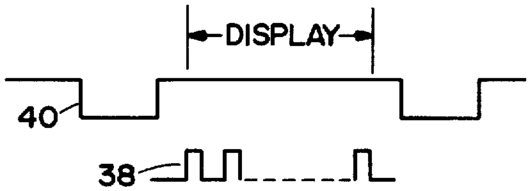

In general, the clocks PAL presents one clock signal, also indicated at 38 in FIG. 2, for each character row of the display which occurs between vertical sync pulses 40 as generated by the terminal display. No display occurs during the vertical blanking period which includes the vertical sync pulses 40. As illustrated in FIG. 1, each of the clocks PAL and window PAL circuits also receives the vertical sync from line 42 which operates as a load signal for the window PAL 18. Clocks PAL 20 further receives a vertical reset signal at 44 and a 25.2 megahertz clock at 26.

At every vertical sync time, when the picture isn't being displayed, the window PAL 18 is re-loaded with values written into latch 14. When the vertical sync signal concludes, the window PAL 18 goes to the state indicated by the top bits from latch 14. If the top bits indicate a zero, the entire screen will be blanked insofar as rows of alphanumeric characters are concerned.

Figure 7:
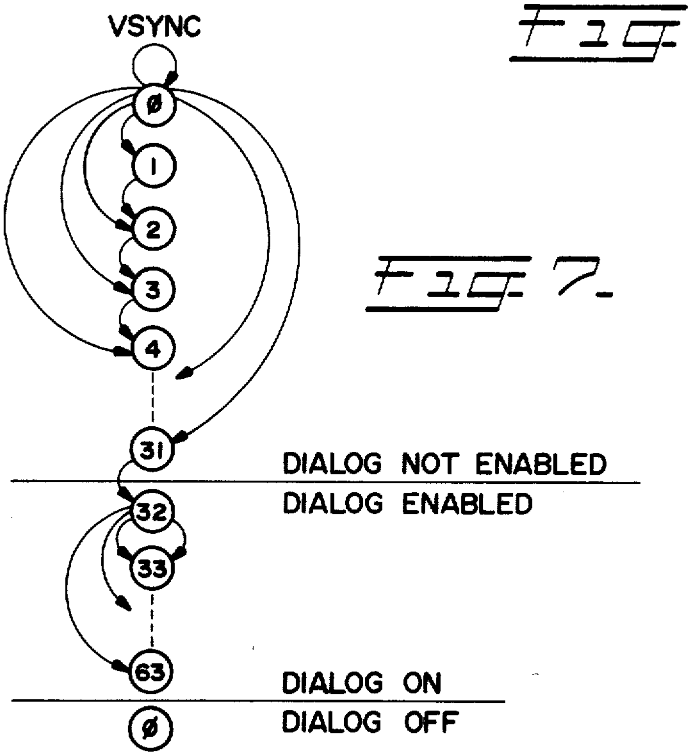
Figure 6:
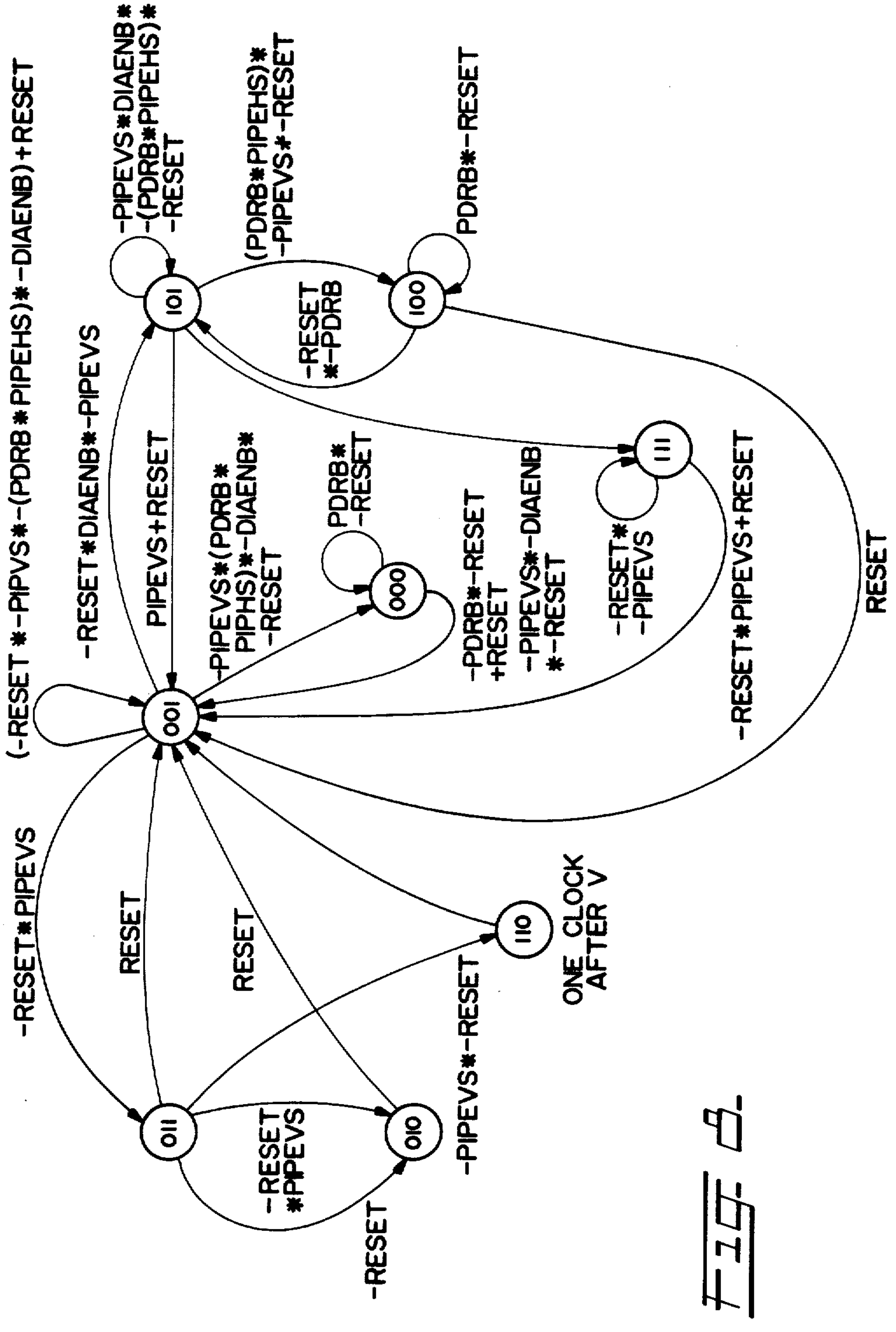

The window PAL (or window shade PAL) 18 normally passes through a number of states which are illustrated in FIG. 7. The window PAL 18 is set to one of the top states (0 through 31 in FIG. 7), with the state number determining the number of rows of alphanumeric characters that are "skipped" before the display is presented on the screen. Thus, the window PAL 18 may be viewed as a counter that can be loaded with the top bits from latch 14 and which then counts to thirty-one. The sixth bit position generated by the window PAL 18 is the dialog enable signal on line 34 occuring when the window PAL changes from state 31 to state 32. At state 32, the bottom bits from latch 14 indicate the state to which the window PAL is loaded for setting how many lines of visible alphanumeric characters will be presented before the dialog enable signal is turned off. Dialog (alphanumerics) turnoff occurs when the window PAL changes from state 63 back to state 0. This state diagram, as well as the state diagram (FIG. 8) for clocks PAL 20, will be described subsequently in greater detail.

As the window PAL 18 changes from state 31 to state 32, the output on line 34, i.e. DIAENB-0, is produced which is employed to enable or blank the alphanumeric portion of the cathode ray tube display of the terminal in a conventional manner. It is termed the attribute control and serves to enable the desired number of circuits which pertain to the alphanumeric display.

Figure 6:
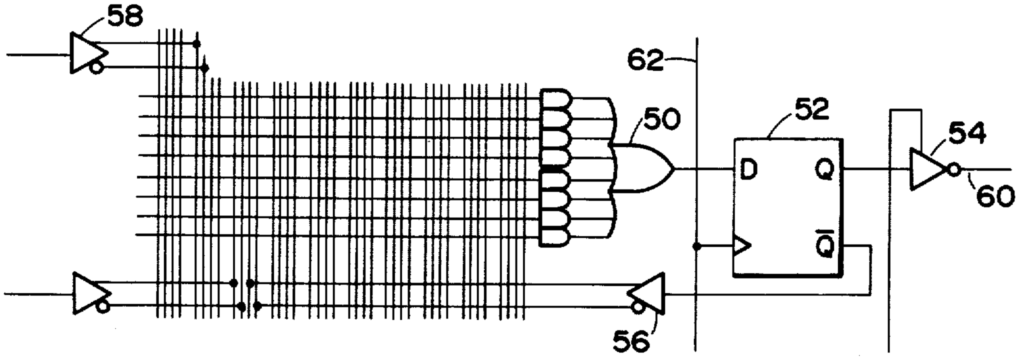

Referring to FIG. 6, each of the PALs comprises a programmable array logic circuit illustrated in part in the figure. Each of the state outputs (six for window PAL 18, and three for the WINCLK portion of clocks PAL 20) are generated by a logic circuit of the type depicted comprising an OR gate 50 provided with a number of inputs via drivers from horizontal lines of the matrix, with the OR gate driving a D flip-flop 52. The Q ouput of the flip-flop is provided to inverter 54, and also the inverted Q output of the flip-flop is coupled through amplifier 56 to provide inverted feedback and not inverted feedback output to the matrix. A clocking input for the D flip-flop is supplied on lead 62. In order to implement the logic of the PAL, crossovers are enabled at desired interconnections of the horizontal and vertical conductors in accordance with a schedule as hereinafter set forth. Also, the array as depicted in FIG. 6 is repeated n times, where n is the number of state ouputs to be provided on successive leads 60. It will be understood that the vertical lines in FIG. 6 represent inputs from successive input amplifiers such as amplifier 58, as well as feedback from successive feedback amplifiers such as amplifier 56.

FIG. 8 is a state diagram for the WINCLK portion of clocks PAL plane. The VRESET (on lead 44 in FIG. 1) will take PAL 20 to state 1 (binary 001) from any other state. Assume there is a vertical retrace after a reset. The state machine will go from state one (WCLK1) to state three (WCLK3). While the terminal is in vertical retrace, the state will shift back and forth between state three (WCLK3) and state two (WCLK2). While this occurs, the window PAL 18 is clocked on lead 22 since the LSB (least significant bis) of the state machine is the output on lead 22. This causes the window PAL 18 to be set to its state 0 to be ready for the next screen.

When vertical retrace ends, and the PAL 20 is in state three (WCLK3), it will then go to state six (WCLK6). This again clocks the window PAL and causes the window PAL to load the top edge value, i.e. the top bits from latch 14. The window PAL will go to one of the top 31 states.

PAL 20 then goes to state one (WCLK1) which waits for data row boundary (DRB) and H sync. When this occurs, the clocks PAL proceeds to state zero (WCLK0) giving a clock to the window PAL 18. When DRB (data row boundary) is discontinued, the state machine returns to state one (WCLK1). If the dialog area (the area of the screen to be enabled) never occurs or is never enabled, the clocks PAL will remain in these two states until vertical sync occurs. If the dialog area is enabled, the clocks PAL 20 will then go to state five (WCLK5) from state one (WCLK1). While the dialog remains enabled, the clocks PAL 20 will clock at DRB and H sync, going from state five (WCLK5) to state four (WCLK4) and back. If vertical sync comes during this time, an exit from state five (WCLK5) to state one (WCLK1) is accomplished. If the dialog area is defined so that it is disabled before the end of the screen, the clocks PAL goes from state five (WCLK5) to state seven (WCLK7). The clocks PAL then remains in this state until vertical sync. At vertical sync, the clock is stopped to window PAL 18, to prevent wrap around.

In the state diagram, VS refers to vertical sync and PIPEVS refers to pipelined vertical sync or an accurately retimed or re-synced signal appropriate for the circuitry. Similarly, PIPEHS refers to pipelined horizontal sync and PDRB refers to a pipelined data row boundary signal.

Referring to the state diagram of the window PAL 18 in FIG. 7 in greater detail, it is noted this state machine generates the DIAENB-0 (dialog enable-0) signal to determine when the alphanumeric system of the terminal should be enabled. The dialog is settable to become enabled at any line upon the screen, and the dialog may be disabled after so many visible lines. The inputs to the window PAL state machine are five bits of top enable and five bits of bottom disable load information. Also, a load signal (PIPEVS-0) is provided to load the count of the top edge during vertical time. The clock signal is a derivation of DRB, H sync and V sync as presented on line 22 from the clocks PAL 20 as hereinbefore mentioned. The conditions on the clock on line 22 are as follows: There must be one clock while PIPEVS-0 is low. More clocks are possible, but at least one is required. This causes the window PAL state machine to go to state zero and stay there while PIPEVS-0 is active. The load pulse is then removed and one additional clock is given. This causes the input data for the top window edge (the top bits) to be loaded into the "counter" represented by window PAL 18. Now, the first DRB will cause the "counter" to clock to the next state, depending on the value of the top edge register. In other words, the state machine will jump to some state between 1 and 31 depending on the top bits. Then, depending upon the value jumped to, after some number of clocks occuring while lines of characters are not seen on the screen, the dialog or alphanumeric area will be enabled to the generation of DIAENB-0, when the "counter" reaches 32.

When the dialog area becomes enabled, the window PAL 18 then loads the bottom register bits. This sets the number of counts before the dialog is disabled again. When this count is reached, the clock for the window PAL will stop so that wrap around of the dialog enable signal is not possible. When PIPEVS-0 becomes active, the cycle begins again.

In this particular embodiment, because of the clocks required to load the window PAL, there is a limit to the minimum number of lines that can be displayed. An extra clock occurs when PIPEVS-0 becomes inactive and this loads the top edge value. Then, the first DRB derivation causes the state machine to clock, and this could enable the dialog. One clock is required to load the bottom edge and this displayed one line of dialog. One clock is required to disable the dialog enable signal and this displayed the second line. Consequently, the minimum size of a window in accordance with the particular embodiment is two lines. Of course, the display can be totally turned off by writing a "top" value of zero.

The logical equations setting forth the logical functions of clocks PAL 20 are given as follows. It will be observed that two additional outputs, DCARE2 and DCARE3, are also set forth, inasmuch as they provide inputs for the logical determination of WINCLK provided on lead 22.

LOGICAL EQUATIONS FOR WINCLK PORTION OF CLOCKS PAL:

```
DCARE3=/VRESET * /PIPEVS * DCARE3 * WINCLK +
/PIPEDRB * CLKTST * /DCARE3 * /DCARE2 * /WINCLK +
/VRESET * DCARE3 * /DCARE2 * /WINCLK +
/VRESET * /PIPEVS * DIAENB * /DCARE3 *
/DCARE2 * WINCLK +
/VRESET * /PIPEVS * DCARE2 * WINCLK +
VRESET * /DCARE3 * /DCARE2 * /WINCLK
DCARE2:=/PIPEDRB * CLKTST * /DCARE3 * /DCARE2 *
/WINCLK + /VRESET * /PIPEVS *
/DIAENB * DCARE3 * WINCLK +
/VRESET * /PIPEVS * DCARE2 * WINCLK +
/VRESET * PIPEVS * /DCARE3 * WINCLK +
/VRESET * /DCARE3 * DCARE2 +
VRESET * /DCARE3 * /DCARE2 * /WINCLK
WINCLK:=/PIPEHS * /DCARE2 * WINCLK +
/PIPEDRB * /DCARE2 +
/VRESET * /PIPEVS * /DIAENB * DCARE3 * WINCLK +
/VRESET * /PIPEVS * DIAENB * /DCARE3 *
/DCARE2 * WINCLK + VRESET +
DCARE2 * /WINCLK +
DCARE3 * DCARE2 +
PIPEVS * /DCARE2 * WINCLK
```

The output WINCLK is provided on lead 22 to the window PAL. CLKTST will always cause full screen at the bottom, but its non-assertion will not affect the described procedure.

The following is a description in high level state machine language of the pertinent portion of the clocks PAL.

```
#THIS MACHINE GENERATES THE CLOCK FOR THE WINDOW SHADE PAL.

#**********************************************************************

STATE WCLK1 001

ON  VRESET +                    # IF IT IS RESET
                        # OR
   -VRESET *                    # NOT RESET
   -(                           # AND NOT
      PIPEHS *                        # PIPELINED HSYNC
      PIPEDRB                         # AND DATA ROW BOUNDARY
    ) *
   -PIPEVS *                    # AND NOT VERTICAL SYNC
   -DIAENB                      # AND THE DIALOG HAS NOT BEEN ENABLED

GOTO WCLK1                      # STAY IN THIS STATE TO NOT CLOCK WINDOW PAL

#**********************************************************************
```

```
ON -VRESET *                # IF IT IS NOT RESET
   PIPEHS *                 # AND PIPELINED H SYNC
   PIPEDRB *                # AND DATA ROW BOUNDARY
  -PIPEVS *                 # AND NOT VERTICAL SYNC
  -DIAENB                   # AND THE DIALOG IS NOT ENABLED

GOTO WCLK0                  # GOTO WCLK0 TO CLOCK THE WINDOW SHADE PAL
#*************************************************************************

ON -VRESET *                # IF IT IS NOT RESET
    PIPEVS                  # AND IT IS VERTICAL SYNC

GOTO WCLK3                  # GOTO HERE TO WAIT FOR VERTICAL SYNC
#*************************************************************************

ON -VRESET *                # IF IT IS NOT RESET
   -PIPEVS *                # AND NOT VERTICAL SYNC
    DIAENB                  # AND THE DIALOG IS ENABLED

GOTO WCLK5                  # GO HERE TO WAIT FOR VERTICAL OR DIALOG
                            # NOT ENABLED FROM BOTTOM EDGE
#*************************************************************************

STATE WCLK0 000

ON -VRESET *                # IF IT IS NOT RESET
    PIPEDRB                 # AND STILL DATA ROW BOUNDARY

GOTO WCLK0                  # WAIT HERE
#*************************************************************************

ON  VRESET +                # IF IT IS RESET
                      # OR
   -VRESET *                # IT IS NOT RESET
   -PIPEDRB *               # AND DATA ROW BOUNDARY
   -CLKTST
GOTO WCLK1                  # GO BACK TO WAIT FOR THE NEXT ROW OF CHAR'S

ON  VRESET +                # IF IT IS RESET
                      # OR
   -VRESET *                # IT IS NOT RESET
   -PIPEDRB *               # AND DATA ROW BOUNDARY
    CLKTST
GOTO WCLK7                  # MAKE SURE IT STAYS ON IN CLKTST MODE
#*************************************************************************

STATE WCLK3 011

ON -VRESET *                # IF IT IS NOT RESET
    PIPEVS                  # AND VERTICAL SYNC

GOTO WCLK2                  # GO HERE TO CLOCK
                            # PAL TO BE SURE IT GETS LOADED

#*************************************************************************
```

```
ON  VRESET                  # IF IT IS BEING RESET

GOTO WCLK1                  # GOTO WCLK1
#**************************************************************************

ON -VRESET *                # IF IT IS NOT RESET
   -PIPEVS                  # AND NOT VERTICAL SYNC

GOTO WCLK6                  # GO HERE TO GIVE ONE CLOCK BEFORE SCREEN
                            # IS ACTIVE TO MAKE TOP PORTION OF WINDOW PAL
                            # LOAD TO ITS VALUE

#**************************************************************************
STATE WCLK2 010

ON -VRESET                  # IF ITS NOT RESET

GOTO WCLK3                  # GO BACK TO WCLK3 TO CLOCK WINDOW PAL

#**************************************************************************

ON  VRESET                  # IF IT IS RESET

GOTO WCLK1                  # GOTO HERE FOR TESTING

#**************************************************************************

STATE WCLK6 110

ON  VRESET +                # IF IT IS BEING RESET
   -VRESET                  # OR IT IS NOT BEING RESET

GOTO WCLK1                  # GO BACK TO HERE AFTER EXTRA CLOCK

#**************************************************************************

STATE WCLK5 101

ON  VRESET +                # IF IT IS RESET
    PIPEVS                  # AND VERTICAL SYNC

GOTO WCLK1                  # GO BACK AND GET READY FOR NEXT SCREEN

#**************************************************************************

ON -VRESET *                # IF IT IS NOT RESET
   -PIPEVS *                # AND NOT VERTICAL SYNC
    DIAENB *                # AND THE DIALOG IS ENABLED
   -(                       # AND IT IS NOT
      PIPEHS *                    # HORIZONTAL SYNC
      PIPEDRB                     # AND DATA ROW BOUNDARY
    )

GOTO WCLK5                  # WAIT HERE UNTIL TIME FOR CLOCK

#**************************************************************************
```

```
ON -VRESET *                   # IF IT IS NOT RESET
   -PIPEVS *                   # AND NOT VERTICAL SYNC
    DIAENB *                   # AND THE DIALOG IS ENABLED
    PIPEHS *                   # AND IT IS H SYNC
    PIPEDRB                    # AND IT IS DATA ROW BOUNDARY

GOTO WCLK4                     # GO BACK TO WAIT FOR NEXT CLOCK
#*********************************************************************

ON -VRESET *                   # IF IT IS NOT RESET
   -PIPEVS *                   # AND NOT VERTICAL SYNC
   -DIAENB                     # AND THE DIALOG WENT TO DISABLED

GOTO WCLK7                     # GO TO HERE TO STOP CLOCK UNTIL VERTICAL

#*********************************************************************

STATE WCLK4 100

ON  VRESET                     # IF IT IS RESET

GOTO WCLK1                     # GOTO HERE

#*********************************************************************

ON -VRESET *                   # IF IT IS NOT RESET
   -PIPEDRB                    # AND NOT DATA ROW BOUNDARY

GOTO  WCLK5                    # GO BACK FOR NEXT CLOCK

#*********************************************************************

ON -VRESET *                   # IF IT IS NOT RESET
    PIPEDRB                    # AND DATA ROW BOUNDARY

GOTO WCLK4                     # WAIT HERE BEFORE GOING BACK FOR NEXT CLOCK

#*********************************************************************

STATE WCLK7 111

ON -VRESET *                   # IF IT IS NOT RESET
   -PIPEVS                     # AND NOT VERTICAL SYNC

GOTO WCLK7                     # WAIT HERE FOR NO CLOCKS TO WINDOW PAL

#*********************************************************************

ON  VRESET +                   # IF IT IS RESET
                          # OR
    (
      -VRESET *                # IT IS NOT RESET
       PIPEVS                  # AND VERTICAL SYNC
    )

GOTO WCLK1                     # GO BACK TO HERE FOR NEXT SCREEN

#*****************************************************************
```

The following is a scheduel of fuse connections for the clocks PAL, model 20R8 manufactured by Monolithic Memories, Inc.

WINDOW SHADE CLOCK

| | | | 11 | 1111 | 1111 | 2222 | 2222 | 2233 | 3333 | 3333 |
|---|---|---|---|---|---|---|---|---|---|---|
| | 0123 | 4567 | 8901 | 2345 | 6789 | 0123 | 4567 | 8901 | 2345 | 6789 |
| 0 | 0000 | 0000 | 0000 | 0000 | 0000 | 0000 | 0000 | 0000 | 0000 | 0000 |
| 1 | 0000 | 0000 | 0000 | 0000 | 0000 | 0000 | 0000 | 0000 | 0000 | 0000 |
| 2 | 0000 | 0000 | 0000 | 0000 | 0000 | 0000 | 0000 | 0000 | 0000 | 0000 |
| 3 | 0000 | 0000 | 0000 | 0000 | 0000 | 0000 | 0000 | 0000 | 0000 | 0000 |
| 4 | 0000 | 0000 | 0000 | 0000 | 0000 | 0000 | 0000 | 0000 | 0000 | 0000 |
| 5 | 0000 | 0000 | 0000 | 0000 | 0000 | 0000 | 0000 | 0000 | 0000 | 0000 |
| 6 | 0000 | 0000 | 0000 | 0000 | 0000 | 0000 | 0000 | 0000 | 0000 | 0000 |
| 7 | 0000 | 0000 | 0000 | 0000 | 0000 | 0000 | 0000 | 0000 | 0000 | 0000 |
| 8 | ---- | ---- | ---- | -X-- | X--- | ---- | ---- | ---- | -X-- | ---- |
| 9 | ---- | ---- | ---- | X--- | X--- | ---- | ---- | ---- | ---- | ---X |
| 10 | XXXX | XXXX | XXXX | XXXX | XXXX | XXXX | XXXX | XXXX | XXXX | XXXX |
| 11 | XXXX | XXXX | XXXX | XXXX | XXXX | XXXX | XXXX | XXXX | XXXX | XXXX |
| 12 | XXXX | XXXX | XXXX | XXXX | XXXX | XXXX | XXXX | XXXX | XXXX | XXXX |
| 13 | XXXX | XXXX | XXXX | XXXX | XXXX | XXXX | XXXX | XXXX | XXXX | XXXX |
| 14 | XXXX | XXXX | XXXX | XXXX | XXXX | XXXX | XXXX | XXXX | XXXX | XXXX |
| 15 | XXXX | XXXX | XXXX | XXXX | XXXX | XXXX | XXXX | XXXX | XXXX | XXXX |
| 16 | -X-- | ---- | ---X | ---- | X--- | ---- | ---- | ---- | ---- | ---- |
| 17 | ---- | ---- | --X- | ---- | X--- | ---- | ---- | ---- | ---X | ---- |
| 18 | ---- | ---- | ---X | ---- | X--- | ---- | ---- | ---- | --X- | ---- |
| 19 | XXXX | XXXX | XXXX | XXXX | XXXX | XXXX | XXXX | XXXX | XXXX | XXXX |
| 20 | XXXX | XXXX | XXXX | XXXX | XXXX | XXXX | XXXX | XXXX | XXXX | XXXX |
| 21 | XXXX | XXXX | XXXX | XXXX | XXXX | XXXX | XXXX | XXXX | XXXX | XXXX |
| 22 | XXXX | XXXX | XXXX | XXXX | XXXX | XXXX | XXXX | XXXX | XXXX | XXXX |
| 23 | XXXX | XXXX | XXXX | XXXX | XXXX | XXXX | XXXX | XXXX | XXXX | XXXX |
| 24 | ---- | X--- | ---- | ---X | X--- | ---- | ---X | ---- | ---- | ---- |
| 25 | ---- | ---- | X--- | --X- | ---- | --X- | --X- | X--- | ---- | ---- |
| 26 | ---- | ---- | ---- | ---X | X--- | --X- | --X- | ---- | ---- | ---- |
| 27 | ---- | X--- | ---- | --X- | X--- | --X- | -X-X | ---- | ---- | ---- |
| 28 | ---- | X--- | ---- | ---- | X--- | ---X | ---X | ---- | ---- | ---- |
| 29 | ---- | ---- | ---- | --X- | -X-- | --X- | --X- | ---- | ---- | ---- |
| 30 | XXXX | XXXX | XXXX | XXXX | XXXX | XXXX | XXXX | XXXX | XXXX | XXXX |
| 31 | XXXX | XXXX | XXXX | XXXX | XXXX | XXXX | XXXX | XXXX | XXXX | XXXX |
| 32 | ---- | ---- | ---- | ---- | -X-- | ---- | ---- | ---- | ---- | ---- |
| 33 | ---- | ---- | ---- | ---- | ---X | -X-- | ---- | ---- | ---- | ---- |
| 34 | ---- | ---- | X--- | ---- | ---- | ---- | ---- | ---- | ---- | ---- |
| 35 | X--- | ---- | ---- | ---- | ---X | ---- | ---- | ---- | ---- | ---- |
| 36 | XXXX | XXXX | XXXX | XXXX | XXXX | XXXX | XXXX | XXXX | XXXX | XXXX |
| 37 | XXXX | XXXX | XXXX | XXXX | XXXX | XXXX | XXXX | XXXX | XXXX | XXXX |
| 38 | XXXX | XXXX | XXXX | XXXX | XXXX | XXXX | XXXX | XXXX | XXXX | XXXX |
| 39 | XXXX | XXXX | XXXX | XXXX | XXXX | XXXX | XXXX | XXXX | XXXX | XXXX |

| | | | | | | | | | | |
|---|---|---|---|---|---|---|---|---|---|---|
| 40 | ---- | ---- | X--- | --X- | ---- | --X- | --X- | X--- | ---- | ---- |
| 41 | ---- | X--- | ---- | ---X | X--- | ---- | X--X | ---- | ---- | ---- |
| 42 | ---- | X--- | ---- | ---- | X--- | ---X | ---X | ---- | ---- | ---- |
| 43 | ---- | -X-- | ---- | --X- | X--- | ---- | ---X | ---- | ---- | ---- |
| 44 | ---- | ---- | ---- | --X- | X--- | ---X | ---- | ---- | ---- | ---- |
| 45 | ---- | ---- | ---- | --X- | -X-- | --X- | --X- | ---- | ---- | ---- |
| 46 | XXXX | XXXX | XXXX | XXXX | XXXX | XXXX | XXXX | XXXX | XXXX | XXXX |
| 47 | XXXX | XXXX | XXXX | XXXX | XXXX | XXXX | XXXX | XXXX | XXXX | XXXX |
| | | | | | | | | | | |
| 48 | X--- | ---- | ---- | ---- | ---- | --X- | ---X | ---- | ---- | ---- |
| 49 | ---- | ---- | X--- | ---- | ---- | --X- | ---- | ---- | ---- | ---- |
| 50 | ---- | X--- | ---- | ---X | X--- | ---- | X--X | ---- | ---- | ---- |
| 51 | ---- | X--- | ---- | --X- | X--- | --X- | -X-X | ---- | ---- | ---- |
| 52 | ---- | ---- | ---- | ---- | -X-- | ---- | ---- | ---- | ---- | ---- |
| 53 | ---- | ---- | ---- | ---- | ---- | ---X | --X- | ---- | ---- | ---- |
| 54 | ---- | ---- | ---- | ---X | ---- | ---X | ---- | ---- | ---- | ---- |
| 55 | ---- | -X-- | ---- | ---- | ---- | --X- | ---X | ---- | ---- | ---- |
| | | | | | | | | | | |
| 56 | ---- | ---- | X--- | ---- | X--- | ---- | ---- | ---X | ---- | ---- |
| 57 | ---- | -X-- | ---- | ---- | X--- | ---- | ---- | ---- | ---- | ---- |
| 58 | XXXX | XXXX | XXXX | XXXX | XXXX | XXXX | XXXX | XXXX | XXXX | XXXX |
| 59 | XXXX | XXXX | XXXX | XXXX | XXXX | XXXX | XXXX | XXXX | XXXX | XXXX |
| 60 | XXXX | XXXX | XXXX | XXXX | XXXX | XXXX | XXXX | XXXX | XXXX | XXXX |
| 61 | XXXX | XXXX | XXXX | XXXX | XXXX | XXXX | XXXX | XXXX | XXXX | XXXX |
| 62 | XXXX | XXXX | XXXX | XXXX | XXXX | XXXX | XXXX | XXXX | XXXX | XXXX |
| 63 | XXXX | XXXX | XXXX | XXXX | XXXX | XXXX | XXXX | XXXX | XXXX | XXXX |
| | | | | | | | | | | |
| 64 | -X-- | ---- | ---- | ---- | X--- | ---- | ---- | ---- | --X- | ---- |
| 65 | -X-- | ---- | ---X | ---- | X--- | ---- | ---- | ---- | ---- | ---- |
| 66 | ---- | ---- | --X- | -X-- | X--- | ---- | ---- | ---- | ---X | ---- |
| 67 | ---- | ---- | ---X | ---- | X--- | ---- | ---- | ---- | --X- | ---- |
| 68 | XXXX | XXXX | XXXX | XXXX | XXXX | XXXX | XXXX | XXXX | XXXX | XXXX |
| 69 | XXXX | XXXX | XXXX | XXXX | XXXX | XXXX | XXXX | XXXX | XXXX | XXXX |
| 70 | XXXX | XXXX | XXXX | XXXX | XXXX | XXXX | XXXX | XXXX | XXXX | XXXX |
| 71 | XXXX | XXXX | XXXX | XXXX | XXXX | XXXX | XXXX | XXXX | XXXX | XXXX |
| | | | | | | | | | | |
| 72 | 0000 | 0000 | 0000 | 0000 | 0000 | 0000 | 0000 | 0000 | 0000 | 0000 |
| 73 | 0000 | 0000 | 0000 | 0000 | 0000 | 0000 | 0000 | 0000 | 0000 | 0000 |
| 74 | 0000 | 0000 | 0000 | 0000 | 0000 | 0000 | 0000 | 0000 | 0000 | 0000 |
| 75 | 0000 | 0000 | 0000 | 0000 | 0000 | 0000 | 0000 | 0000 | 0000 | 0000 |
| 76 | 0000 | 0000 | 0000 | 0000 | 0000 | 0000 | 0000 | 0000 | 0000 | 0000 |
| 77 | 0000 | 0000 | 0000 | 0000 | 0000 | 0000 | 0000 | 0000 | 0000 | 0000 |
| 78 | 0000 | 0000 | 0000 | 0000 | 0000 | 0000 | 0000 | 0000 | 0000 | 0000 |
| 79 | 0000 | 0000 | 0000 | 0000 | 0000 | 0000 | 0000 | 0000 | 0000 | 0000 |

LEGEND: X : FUSE NOT BLOWN (L,N,0) - : FUSE BLOWN (H,P,1)
0 : PHANTOM FUSE (L,N,0) O : PHANTOM FUSE (H,P,1)

NUMBER OF FUSES BLOW = 1285

Lines 24-29 pertain to DCARE3, lines 40-45 pertain to DCARE2 and lines 48-55 pertain to WINCLK.

The logical equations setting forth the logical functions of the window or window shade PAL 18 are as follows:

```
DIAENB:=/VRESET * /PIPEVS *
/DIAENB * WIN4 * WIN3 * WIN2 * WIN1 * WIN0 +
/VRESET * /PIPEVS * DIAENB * /WIN1 +
/VRESET * /PIPEVS * DIAENB * /WIN2 +
/VRESET * /PIPEVS * DIAENB * /WIN3 +
/VRESET * /PIPEVS * DIAENB * /WIN4 +
/VRESET * /PIPEVS * DIAENB * /WIN0
WIN4:=/VRESET * /PIPEVS * TOP4 * /DIAENB * /WIN3 *
/WIN2 * /WIN1 * /WIN0 + /VRESET * /PIPEVS *
/WIN4 * WIN3 * WIN2 * WIN1 * WIN0 +
/VRESET * /PIPEVS * WIN4 * /WIN0 +
/VRESET * /PIPEVS * WIN4 * /WIN1 +
/VRESET * /PIPEVS * WIN4 * /WIN2 +
/VRESET * /PIPEVS * WIN4 * /WIN3 +
/VRESET * /PIPEVS * BOT4 * DIAENB * /WIN3 * /WIN2 *
/WIN1 * /WIN0
WIN3:=/VRESET * /PIPEVS * TOP3 * /DIAENB * /WIN4 *
/WIN2 * /WIN1 * /WIN0 +
/VRESET * /PIPEVS * /WIN3 * WIN2 * WIN1 * WIN0 +
/VRESET * /PIPEVS * WIN3 * /WIN0 +
/VRESET * /PIPEVS * WIN3 * /WIN1 +
/VRESET * /PIPEVS * WIN3 * /WIN2 +
/VRESET * /PIPEVS * BOT3 * DIAENB * /WIN4 * /WIN2 *
/WIN1 * /WIN0
WIN2:=/VRESET * /PIPEVS * TOP2 * /DIAENB * /WIN4 *
/WIN3 * /WIN1 * /WIN0 +
/VRESET * /PIPEVS * /WIN2 * WIN1 * WIN0 +
/VRESET * /PIPEVS * WIN2 * /WIN0 +
/VRESET * /PIPEVS * WIN2 * /WIN1 +
/VRESET * /PIPEVS * BOT2 * DIAENB * /WIN4 * /WIN3 *
/WIN1 * /WIN0
WIN1:=/VRESET * /PIPEVS * TOP1 * /DIAENB * /WIN4 *
/WIN3 * /WIN2 * /WIN0 +
/VRESET * /PIPEVS * /WIN1 * WIN0 +
/VRESET * /PIPEVS * WIN1 * /WIN0 +
/VRESET * /PIPEVS * BOT1 * DIAENB * /WIN4 * /WIN3 *
/WIN2 * /WIN0
WIN0:=/VRESET * /PIPEVS * TOP0 * /DIAENB * /WIN0 +
/VRESET * /PIPEVS * WIN1 * /WIN0 +
/VRESET * /PIPEVS * WIN2 * /WIN0 +
/VRESET * /PIPEVS * WIN3 * /WIN0 +
/VRESET * /PIPEVS * WIN4 * /WIN0 +
/VRESET * /PIPEVS * /BOT4 * /BOT3 * /BOT2 *
/BOT1 * DIAENB * /WIN0 +
/VRESET * /PIPEVS * BOT0 * DIAENB * /WIN0
```

It will be observed that five state outputs in addition to DIAENB are provided, namely WIN0, WIN1, WIN2, WIN3 and WIN4, these being used as inputs in the determination of DIAENB.

The following is a description in high level state machine language of the window or window shade PAL 14:

```
#***********************************************************************

STATE W0 000000

ON VRESET OUT DCARE        # THIS IS JUST TO MAKE THIS AN OUTPUT

ON  VRESET   +             # IF IT IS BEING RESET
    PIPEVS +               # OR IF IT IS STILL VERTICAL SYNC
      (                    # OR IT IS
       -VRESET *                                   # NOT RESET
       -PIPEVS *                                   # AND NOT VERTICAL SYNC
       -TOP4 * -TOP3 * -TOP2 * -TOP1 * -TOP0 # AND TOP EDGE VALUE IS 0
      )
GOTO W0                    # THEN STAY IN STATE W0 WHICH KEEPS THE
                           # DIALOG ENABLE SIGNAL FALSE FOREVER.

#***********************************************************************

ON                         # IF IT IS
       -VRESET *                                   # NOT RESET
       -PIPEVS *                                   # AND NOT VERTICAL SYNC
       -TOP4 * -TOP3 * -TOP2 * -TOP1 *  TOP0 # AND TOP EDGE VALUE IS 1

GOTO W1                    # THEN GOTO W1 WHICH WILL ENABLE THE DIALOG
                           # FOR 2 LINES BEFORE THE END OF THE SCREEN

#***********************************************************************

ON                         # IF IT IS
       -VRESET *                                   # NOT RESET
       -PIPEVS *                                   # AND NOT VERTICAL SYNC
       -TOP4 * -TOP3 * -TOP2 *  TOP1 * -TOP0 # AND TOP EDGE VALUE IS 2

GOTO W2                    # THEN GOTO W2 WHICH WILL ENABLE THE DIALOG
                           # FOR 3 LINES BEFORE THE END OF THE SCREEN

#***********************************************************************
```

```
ON                          # IF IT IS
       -VRESET *                                     # NOT RESET
       -PIPEVS *                                     # AND NOT VERTICAL SYNC
       -TOP4 * -TOP3 * -TOP2 *  TOP1 *  TOP0 # AND TOP EDGE VALUE IS 3

GOTO W3                     # THEN GOTO W3 WHICH WILL ENABLE THE DIALOG
                            # FOR 4 LINES BEFORE THE END OF THE SCREEN
#*************************************************************************

ON                          # IF IT IS
       -VRESET *                                     # NOT RESET
       -PIPEVS *                                     # AND NOT VERTICAL SYNC
       -TOP4 * -TOP3 *  TOP2 * -TOP1 * -TOP0 # AND TOP EDGE VALUE IS 4

GOTO W4                     # THEN GOTO W4 WHICH WILL ENABLE THE DIALOG
                            # FOR 5 LINES BEFORE THE END OF THE SCREEN

#*************************************************************************

ON                          # IF IT IS
       -VRESET *                                     # NOT RESET
       -PIPEVS *                                     # AND NOT VERTICAL SYNC
       -TOP4 * -TOP3 *  TOP2 * -TOP1 *  TOP0 # AND TOP EDGE VALUE IS 5

GOTO W5                     # THEN GOTO W5 WHICH WILL ENABLE THE DIALOG
                            # FOR 6 LINES BEFORE THE END OF THE SCREEN

#*************************************************************************

ON                          # IF IT IS
       -VRESET *                                     # NOT RESET
       -PIPEVS *                                     # AND NOT VERTICAL SYNC
       -TOP4 * -TOP3 *  TOP2 *  TOP1 * -TOP0 # AND TOP EDGE VALUE IS 6

GOTO W6                     # THEN GOTO W6 WHICH WILL ENABLE THE DIALOG
                            # FOR 7 LINES BEFORE THE END OF THE SCREEN

#*************************************************************************

ON                          # IF IT IS
       -VRESET *                                     # NOT RESET
       -PIPEVS *                                     # AND NOT VERTICAL SYNC
       -TOP4 * -TOP3 *  TOP2 *  TOP1 *  TOP0 # AND TOP EDGE VALUE IS 7

GOTO W7 .                   # THEN GOTO W7 WHICH WILL ENABLE THE DIALOG
                            # FOR 8 LINES BEFORE THE END OF THE SCREEN

#*************************************************************************

ON                          # IF IT IS
       -VRESET *                                     # NOT RESET
       -PIPEVS *                                     # AND NOT VERTICAL SYNC
       -TOP4 *  TOP3 * -TOP2 * -TOP1 * -TOP0 # AND TOP EDGE VALUE IS 8

GOTO W8                     # THEN GOTO W8 WHICH WILL ENABLE THE DIALOG
                            # FOR 9 LINES BEFORE THE END OF THE SCREEN

#*************************************************************************
```

```
ON                             # IF IT IS
      -VRESET *                                      # NOT RESET
      -PIPEVS *                                      # AND NOT VERTICAL SYNC
      -TOP4 *  TOP3 * -TOP2 * -TOP1 *  TOP0 # AND TOP EDGE VALUE IS 9

GOTO W9                        # THEN GOTO W9 WHICH WILL ENABLE THE DIALOG
                               # FOR 10 LINES BEFORE THE END OF THE SCREEN

#**********************************************************************

ON                             # IF IT IS
      -VRESET *                                      # NOT RESET
      -PIPEVS *                                      # AND NOT VERTICAL SYNC
      -TOP4 *  TOP3 * -TOP2 *  TOP1 * -TOP0 # AND TOP EDGE VALUE IS 10

GOTO W10                       # THEN GOTO W10 WHICH WILL ENABLE THE DIALOG
                               # FOR 11 LINES BEFORE THE END OF THE SCREEN

#**********************************************************************

ON                             # IF IT IS
      -VRESET *                                      # NOT RESET
      -PIPEVS *                                      # AND NOT VERTICAL SYNC
      -TOP4 *  TOP3 * -TOP2 *  TOP1 *  TOP0 # AND TOP EDGE VALUE IS 11

GOTO W11                       # THEN GOTO W11 WHICH WILL ENABLE THE DIALOG
                               # FOR 12 LINES BEFORE THE END OF THE SCREEN

#**********************************************************************

ON                             # IF IT IS
      -VRESET *                                      # NOT RESET
      -PIPEVS *                                      # AND NOT VERTICAL SYNC
      -TOP4 *  TOP3 *  TOP2 * -TOP1 * -TOP0 # AND TOP EDGE VALUE IS 12

GOTO W12                       # THEN GOTO W12 WHICH WILL ENABLE THE DIALOG
                               # FOR 13 LINES BEFORE THE END OF THE SCREEN

#**********************************************************************

ON                             # IF IT IS
      -VRESET *                                      # NOT RESET
      -PIPEVS *                                      # AND NOT VERTICAL SYNC
      -TOP4 *  TOP3 *  TOP2 * -TOP1 *  TOP0 # AND TOP EDGE VALUE IS 13

GOTO W13                       # THEN GOTO W13 WHICH WILL ENABLE THE DIALOG
                               # FOR 14 LINES BEFORE THE END OF THE SCREEN

#**********************************************************************
ON                             # IF IT IS
      -VRESET *                                      # NOT RESET
      -PIPEVS *                                      # AND NOT VERTICAL SYNC
      -TOP4 *  TOP3 *  TOP2 *  TOP1 * -TOP0 # AND TOP EDGE VALUE IS 14

GOTO W14                       # THEN GOTO W14 WHICH WILL ENABLE THE DIALOG
                               # FOR 15 LINES BEFORE THE END OF THE SCREEN

#**********************************************************************
```

```
ON                          # IF IT IS
      -VRESET *                                     # NOT RESET
      -PIPEVS *                                     # AND NOT VERTICAL SYNC
      -TOP4 *  TOP3 *  TOP2 *  TOP1 *  TOP0 # AND TOP EDGE VALUE IS 15

GOTO W15                    # THEN GOTO W15 WHICH WILL ENABLE THE DIALOG
                            # FOR 16 LINES BEFORE THE END OF THE SCREEN

#**********************************************************************

ON                          # IF IT IS
      -VRESET *                                     # NOT RESET
      -PIPEVS *                                     # AND NOT VERTICAL SYNC
       TOP4 * -TOP3 * -TOP2 * -TOP1 * -TOP0 # AND TOP EDGE VALUE IS 16

GOTO W16                    # THEN GOTO W16 WHICH WILL ENABLE THE DIALOG
                            # FOR 17 LINES BEFORE THE END OF THE SCREEN

#**********************************************************************

ON                          # IF IT IS
      -VRESET *                                     # NOT RESET
      -PIPEVS *                                     # AND NOT VERTICAL SYNC
       TOP4 * -TOP3 * -TOP2 * -TOP1 *  TOP0 # AND TOP EDGE VALUE IS 17

GOTO W17                    # THEN GOTO W17 WHICH WILL ENABLE THE DIALOG
                            # FOR 18 LINES BEFORE THE END OF THE SCREEN

#**********************************************************************

ON                          # IF IT IS
      -VRESET *                                     # NOT RESET
      -PIPEVS *                                     # AND NOT VERTICAL SYNC
       TOP4 * -TOP3 * -TOP2 *  TOP1 * -TOP0 # AND TOP EDGE VALUE IS 18

GOTO W18                    # THEN GOTO W18 WHICH WILL ENABLE THE DIALOG
                            # FOR 19 LINES BEFORE THE END OF THE SCREEN

#**********************************************************************
ON                          # IF IT IS
      -VRESET *                                     # NOT RESET
      -PIPEVS *                                     # AND NOT VERTICAL SYNC
       TOP4 * -TOP3 * -TOP2 *  TOP1 *  TOP0 # AND TOP EDGE VALUE IS 19

GOTO W19                    # THEN GOTO W19 WHICH WILL ENABLE THE DIALOG
                            # FOR 20 LINES BEFORE THE END OF THE SCREEN

#**********************************************************************

ON                          # IF IT IS
      -VRESET *                                     # NOT RESET
      -PIPEVS *                                     # AND NOT VERTICAL SYNC
       TOP4 * -TOP3 *  TOP2 * -TOP1 * -TOP0 # AND TOP EDGE VALUE IS 20

GOTO W20                    # THEN GOTO W20 WHICH WILL ENABLE THE DIALOG
                            # FOR 21 LINES BEFORE THE END OF THE SCREEN

#**********************************************************************
```

```
ON                          # IF IT IS
     -VRESET *                                      # NOT RESET
     -PIPEVS *                                      # AND NOT VERTICAL SYNC
      TOP4 * -TOP3 *  TOP2 * -TOP1 *  TOP0 # AND TOP EDGE VALUE IS 21

GOTO W21                    # THEN GOTO W21 WHICH WILL ENABLE THE DIALOG
                            # FOR 22 LINES BEFORE THE END OF THE SCREEN

#***********************************************************************

ON                          # IF IT IS
     -VRESET *                                      # NOT RESET
     -PIPEVS *                                      # AND NOT VERTICAL SYNC
      TOP4 * -TOP3 *  TOP2 *  TOP1 * -TOP0 # AND TOP EDGE VALUE IS 22

GOTO W22                    # THEN GOTO W22 WHICH WILL ENABLE THE DIALOG
                            # FOR 23 LINES BEFORE THE END OF THE SCREEN

#***********************************************************************

ON                          # IF IT IS
     -VRESET *                                      # NOT RESET
     -PIPEVS *                                      # AND NOT VERTICAL SYNC
      TOP4 * -TOP3 *  TOP2 *  TOP1 *  TOP0 # AND TOP EDGE VALUE IS 23

GOTO W23                    # THEN GOTO W23 WHICH WILL ENABLE THE DIALOG
                            # FOR 24 LINES BEFORE THE END OF THE SCREEN

#***********************************************************************
ON                          # IF IT IS
     -VRESET *                                      # NOT RESET
     -PIPEVS *                                      # AND NOT VERTICAL SYNC
      TOP4 *  TOP3 * -TOP2 * -TOP1 * -TOP0 # AND TOP EDGE VALUE IS 24

GOTO W24                    # THEN GOTO W24 WHICH WILL ENABLE THE DIALOG
                            # FOR 25 LINES BEFORE THE END OF THE SCREEN

#***********************************************************************

ON                          # IF IT IS
     -VRESET *                                      # NOT RESET
     -PIPEVS *                                      # AND NOT VERTICAL SYNC
      TOP4 *  TOP3 * -TOP2 * -TOP1 *  TOP0 # AND TOP EDGE VALUE IS 25

GOTO W25                    # THEN GOTO W25 WHICH WILL ENABLE THE DIALOG
                            # FOR 26 LINES BEFORE THE END OF THE SCREEN

#***********************************************************************

ON                          # IF IT IS

     -VRESET *                                      # NOT RESET
     -PIPEVS *                                      # AND NOT VERTICAL SYNC
      TOP4 *  TOP3 * -TOP2 *  TOP1 * -TOP0 # AND TOP EDGE VALUE IS 26

GOTO W26                    # THEN GOTO W26 WHICH WILL ENABLE THE DIALOG
                            # FOR 27 LINES BEFORE THE END OF THE SCREEN

#***********************************************************************
```

```
ON                          # IF IT IS
      -VRESET *                                    # NOT RESET
      -PIPEVS *                                    # AND NOT VERTICAL SYNC
       TOP4 *  TOP3 * -TOP2 *  TOP1 *  TOP0 # AND TOP EDGE VALUE IS 27

GOTO W27                    # THEN GOTO W27 WHICH WILL ENABLE THE DIALOG
                            # FOR 28 LINES BEFORE THE END OF THE SCREEN

#*********************************************************************

ON                          # IF IT IS
      -VRESET *                                    # NOT RESET
      -PIPEVS *                                    # AND NOT VERTICAL SYNC
       TOP4 *  TOP3 *  TOP2 * -TOP1 * -TOP0 # AND TOP EDGE VALUE IS 28

GOTO W28                    # THEN GOTO W28 WHICH WILL ENABLE THE DIALOG
                            # FOR 29 LINES BEFORE THE END OF THE SCREEN

#*********************************************************************
ON                          # IF IT IS
      -VRESET *                                    # NOT RESET
      -PIPEVS *                                    # AND NOT VERTICAL SYNC
       TOP4 *  TOP3 *  TOP2 * -TOP1 *  TOP0 # AND TOP EDGE VALUE IS 29

GOTO W29                    # THEN GOTO W29 WHICH WILL ENABLE THE DIALOG
                            # FOR 30 LINES BEFORE THE END OF THE SCREEN

#*********************************************************************


ON                          # IF IT IS
      -VRESET *                                    # NOT RESET
      -PIPEVS *                                    # AND NOT VERTICAL SYNC
       TOP4 *  TOP3 *  TOP2 *  TOP1 * -TOP0 # AND TOP EDGE VALUE IS 30

GOTO W30                    # THEN GOTO W30 WHICH WILL ENABLE THE DIALOG
                            # FOR 31 LINES BEFORE THE END OF THE SCREEN

#*********************************************************************

ON                          # IF IT IS
      -VRESET *                                    # NOT RESET
      -PIPEVS *                                    # AND NOT VERTICAL SYNC
       TOP4 *  TOP3 *  TOP2 *  TOP1 *  TOP0 # AND TOP EDGE VALUE IS 31

GOTO W31                    # THEN GOTO W31 WHICH WILL ENABLE THE DIALOG
                            # FOR 32 LINES BEFORE THE END OF THE SCREEN
#*****************************************************************

STATE W1 000001

ON   VRESET + PIPEVS        # VRESET OR VERTICAL SYNC RESETS
GOTO W0

ON  -VRESET * -PIPEVS       # NEXT STATE IF NOT RESET AND NOT VSYNC
GOTO W2

#*****************************************************************
```

```
STATE W2 000010

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W3

#*******************************************************************
STATE W3 000011

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W4

#*******************************************************************

STATE W4 000100

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W5

#*******************************************************************

STATE W5 000101

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W6

#*******************************************************************

STATE W6 000110

ON   VRESET + PIPEVS       # VRESET OR VERTICAL SYNC RESETS

GOTO W0

ON  -VRESET * -PIPEVS      # NEXT STATE IF NOT RESET AND NOT VSYNC
GOTO W7

#*******************************************************************

STATE W7 000111

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W8

#*******************************************************************
```

```
STATE W8 001000

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W9

#*****************************************************************

STATE W9 001001

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W10

#*****************************************************************

STATE W10 001010

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W11

#*****************************************************************

STATE W11 001011

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W12

#*****************************************************************

STATE W12 001100

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W13

#*****************************************************************
STATE W13 001101

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W14

#*****************************************************************
```

```
STATE W14 001110

ON   VRESET + PIPEVS        # VRESET OR VERTICAL SYNC RESETS
GOTO W0

ON  -VRESET * -PIPEVS       # NEXT STATE IF NOT RESET AND NOT VSYNC
GOTO W15

#*****************************************************************

STATE W15 001111

ON   VRESET + PIPEVS        # VRESET OR VERTICAL SYNC RESETS
GOTO W0

ON  -VRESET * -PIPEVS       # NEXT STATE IF NOT RESET AND NOT VSYNC
GOTO W16

#*****************************************************************

STATE W16 010000

ON   VRESET + PIPEVS        # VRESET OR VERTICAL SYNC RESETS
GOTO W0

ON  -VRESET * -PIPEVS       # NEXT STATE IF NOT RESET AND NOT VSYNC
GOTO W17

#*****************************************************************

STATE W17 010001

ON   VRESET + PIPEVS        # VRESET OR VERTICAL SYNC RESETS
GOTO W0

ON  -VRESET * -PIPEVS       # NEXT STATE IF NOT RESET AND NOT VSYNC
GOTO W18

#*****************************************************************

STATE W18 010010

ON   VRESET + PIPEVS        # VRESET OR VERTICAL SYNC RESETS
GOTO W0

ON  -VRESET * -PIPEVS       # NEXT STATE IF NOT RESET AND NOT VSYNC
GOTO W19

#*****************************************************************

STATE W19 010011

ON   VRESET + PIPEVS        # VRESET OR VERTICAL SYNC RESETS
GOTO W0

ON  -VRESET * -PIPEVS       # NEXT STATE IF NOT RESET AND NOT VSYNC
GOTO W20

#*****************************************************************
```

```
STATE W20 010100

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W21

#*****************************************************************

STATE W21 010101

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W22

#*****************************************************************

STATE W22 010110

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W23

#*****************************************************************

STATE W23 010111

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W24

#*****************************************************************

STATE W24 011000

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W25

#*****************************************************************

STATE W25 011001

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W26

#*****************************************************************
```

```
STATE W26 011010

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W27

#**************************************************************

STATE W27 011011

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W28

#**************************************************************

STATE W28 011100

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W29
#********************************************************************

STATE W29 011101

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W30

#********************************************************************

STATE W30 011110

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W31
#*********************************************************************

STATE W31 011111

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W32

#THE WINDOW TURNS ON WHEN THIS BIT OF THE STATE MACHINE COMES ON

#*********************************************************************
```

```
STATE W32 100000

ON   VRESET + PIPEVS        # VRESET OR VERTICAL SYNC RESETS
GOTO W0

ON        (                 # IF IT IS
      -VRESET *                                     # NOT RESET
      -PIPEVS *                                     # AND NOT VERTICAL SYNC
      -BOT4 * -BOT3 * -BOT2 * -BOT1 * -BOT0 # AND BOTTOM EDGE VALUE IS 0
      )
GOTO W33                    # THEN GOTO STATE W33 WHICH KEEPS THE
                            # DIALOG ENABLE SIGNAL ON FOR 32 LINES

ON                          # IF IT IS
      -VRESET *                                     # NOT RESET
      -PIPEVS *                                     # AND NOT VERTICAL SYNC
      -BOT4 * -BOT3 * -BOT2 * -BOT1 *  BOT0 # AND BOTTOM EDGE VALUE IS 1

GOTO W33                    # THEN GOTO W33 WHICH KEEPS THE

                            # DIALOG ENABLE SIGNAL ON FOR 32 LINES

ON                          # IF IT IS
      -VRESET *                                     # NOT RESET
      -PIPEVS *                                     # AND NOT VERTICAL SYNC
      -BOT4 * -BOT3 * -BOT2 *  BOT1 * -BOT0 # AND BOTTOM EDGE VALUE IS 2

GOTO W34                    # THEN GOTO W34 WHICH KEEPS THE
                            # DIALOG ENABLE SIGNAL ON FOR 31 LINES

ON                          # IF IT IS
      -VRESET *                                     # NOT RESET
      -PIPEVS *                                     # AND NOT VERTICAL SYNC
      -BOT4 * -BOT3 * -BOT2 *  BOT1 *  BOT0 # AND BOTTOM EDGE VALUE IS 3

GOTO W35                    # THEN GOTO W35 WHICH KEEPS THE
                            # DIALOG ENABLE SIGNAL ON FOR 30 LINES

ON                          # IF IT IS
      -VRESET *                                     # NOT RESET
      -PIPEVS *                                     # AND NOT VERTICAL SYNC
      -BOT4 * -BOT3 *  BOT2 * -BOT1 * -BOT0 # AND BOTTOM EDGE VALUE IS 4

GOTO W36                    # THEN GOTO W36 WHICH KEEPS THE
                            # DIALOG ENABLE SIGNAL ON FOR 29 LINES

ON                          # IF IT IS
      -VRESET *                                     # NOT RESET
      -PIPEVS *                                     # AND NOT VERTICAL SYNC
      -BOT4 * -BOT3 *  BOT2 * -BOT1 *  BOT0 # AND BOTTOM EDGE VALUE IS 5

GOTO W37                    # THEN GOTO W37 WHICH KEEPS THE
                            # DIALOG ENABLE SIGNAL ON FOR 28 LINES

ON                          # IF IT IS
      -VRESET *                                     # NOT RESET
      -PIPEVS *                                     # AND NOT VERTICAL SYNC
      -BOT4 * -BOT3 *  BOT2 *  BOT1 * -BOT0 # AND BOTTOM EDGE VALUE IS 6
```

```
GOTO W38                    # THEN GOTO W38 WHICH KEEPS THE
                            # DIALOG ENABLE SIGNAL ON FOR 27 LINES

ON                          # IF IT IS
      -VRESET *                                    # NOT RESET
      -PIPEVS *                                    # AND NOT VERTICAL SYNC
      -BOT4 * -BOT3 *  BOT2 *  BOT1 *  BOT0 # AND BOTTOM EDGE VALUE IS 7

GOTO W39                    # THEN GOTO W39 WHICH KEEPS THE
                            # DIALOG ENABLE SIGNAL ON FOR 26 LINES

ON                          # IF IT IS
      -VRESET *                                    # NOT RESET
      -PIPEVS *                                    # AND NOT VERTICAL SYNC
      -BOT4 *  BOT3 * -BOT2 * -BOT1 * -BOT0 # AND BOTTOM EDGE VALUE IS 8

GOTO W40                    # THEN GOTO W40 WHICH KEEPS THE

                            # DIALOG ENABLE SIGNAL ON FOR 25 LINES

ON                          # IF IT IS
      -VRESET *                                    # NOT RESET
      -PIPEVS *                                    # AND NOT VERTICAL SYNC
      -BOT4 *  BOT3 * -BOT2 * -BOT1 *  BOT0 # AND BOTTOM EDGE VALUE IS 9

GOTO W41                    # THEN GOTO W41 WHICH KEEPS THE
                            # DIALOG ENABLE SIGNAL ON FOR 24 LINES

ON                          # IF IT IS
      -VRESET *                                    # NOT RESET
      -PIPEVS *                                    # AND NOT VERTICAL SYNC
      -BOT4 *  BOT3 * -BOT2 *  BOT1 * -BOT0 # AND BOTTOM EDGE VALUE IS 10

GOTO W42                    # THEN GOTO W42 WHICH KEEPS THE
                            # DIALOG ENABLE SIGNAL ON FOR 23 LINES

ON                          # IF IT IS
      -VRESET *                                    # NOT RESET
      -PIPEVS *                                    # AND NOT VERTICAL SYNC
      -BOT4 *  BOT3 * -BOT2 *  BOT1 *  BOT0 # AND BOTTOM EDGE VALUE IS 11

GOTO W43                    # THEN GOTO W43 WHICH KEEPS THE
                            # DIALOG ENABLE SIGNAL ON FOR 22 LINES

ON                          # IF IT IS
      -VRESET *                                    # NOT RESET
      -PIPEVS *                                    # AND NOT VERTICAL SYNC
      -BOT4 *  BOT3 *  BOT2 * -BOT1 * -BOT0 # AND BOTTOM EDGE VALUE IS 12

GOTO W44                    # THEN GOTO W44 WHICH KEEPS THE
                            # DIALOG ENABLE SIGNAL ON FOR 21 LINES

ON                          # IF IT IS
      -VRESET *                                    # NOT RESET
      -PIPEVS *                                    # AND NOT VERTICAL SYNC
      -BOT4 *  BOT3 *  BOT2 * -BOT1 *  BOT0 # AND BOTTOM EDGE VALUE IS 13

GOTO W45                    # THEN GOTO W45 WHICH KEEPS THE
                            # DIALOG ENABLE SIGNAL ON FOR 20 LINES
```

```
ON                          # IF IT IS
       -VRESET *                                       # NOT RESET
       -PIPEVS *                                       # AND NOT VERTICAL SYNC
       -BOT4 *  BOT3 *  BOT2 *  BOT1 * -BOT0 # AND BOTTOM EDGE VALUE IS 14

GOTO W46                    # THEN GOTO W46 WHICH KEEPS THE
                            # DIALOG ENABLE SIGNAL ON FOR 19 LINES

ON                          # IF IT IS
       -VRESET *                                       # NOT RESET
       -PIPEVS *                                       # AND NOT VERTICAL SYNC
       -BOT4 *  BOT3 *  BOT2 *  BOT1 *  BOT0 # AND BOTTOM EDGE VALUE IS 15

GOTO W47                    # THEN GOTO W47 WHICH KEEPS THE


                            # DIALOG ENABLE SIGNAL ON FOR 18 LINES

ON                          # IF IT IS
       -VRESET *                                       # NOT RESET
       -PIPEVS *                                       # AND NOT VERTICAL SYNC
        BOT4 * -BOT3 * -BOT2 * -BOT1 * -BOT0 # AND BOTTOM EDGE VALUE IS 16

GOTO W48                    # THEN GOTO W48 WHICH KEEPS THE
                            # DIALOG ENABLE SIGNAL ON FOR 17 LINES

ON                          # IF IT IS
       -VRESET *                                       # NOT RESET
       -PIPEVS *                                       # AND NOT VERTICAL SYNC
        BOT4 * -BOT3 * -BOT2 * -BOT1 *  BOT0 # AND BOTTOM EDGE VALUE IS 17

GOTO W49                    # THEN GOTO W49 WHICH KEEPS THE
                            # DIALOG ENABLE SIGNAL ON FOR 16 LINES

ON                          # IF IT IS
       -VRESET *                                       # NOT RESET
       -PIPEVS *                                       # AND NOT VERTICAL SYNC
        BOT4 * -BOT3 * -BOT2 *  BOT1 * -BOT0 # AND BOTTOM EDGE VALUE IS 18

GOTO W50                    # THEN GOTO W50 WHICH KEEPS THE
                            # DIALOG ENABLE SIGNAL ON FOR 15 LINES

ON                          # IF IT IS
       -VRESET *                                       # NOT RESET
       -PIPEVS *                                       # AND NOT VERTICAL SYNC
        BOT4 * -BOT3 * -BOT2 *  BOT1 *  BOT0 # AND BOTTOM EDGE VALUE IS 19

GOTO W51                    # THEN GOTO W51 WHICH KEEPS THE
                            # DIALOG ENABLE SIGNAL ON FOR 14 LINES

ON                          # IF IT IS
       -VRESET *                                       # NOT RESET
       -PIPEVS *                                       # AND NOT VERTICAL SYNC
        BOT4 * -BOT3 *  BOT2 * -BOT1 * -BOT0 # AND BOTTOM EDGE VALUE IS 20

GOTO W52                    # THEN GOTO W52 WHICH KEEPS THE
                            # DIALOG ENABLE SIGNAL ON FOR 13 LINES
```

```
ON                                 # IF IT IS
     -VRESET *                                         # NOT RESET
     -PIPEVS *                                         # AND NOT VERTICAL SYNC
      BOT4 * -BOT3 *  BOT2 * -BOT1 *  BOT0 # AND BOTTOM EDGE VALUE IS 21

GOTO W53                           # THEN GOTO W53 WHICH KEEPS THE
                                   # DIALOG ENABLE SIGNAL ON FOR 12 LINES

ON                                 # IF IT IS
     -VRESET *                                         # NOT RESET
     -PIPEVS *                                         # AND NOT VERTICAL SYNC
      BOT4 * -BOT3 *  BOT2 *  BOT1 * -BOT0 # AND BOTTOM EDGE VALUE IS 22

GOTO W54                           # THEN GOTO W54 WHICH KEEPS THE

                                   # DIALOG ENABLE SIGNAL ON FOR 11 LINES

ON                                 # IF IT IS
     -VRESET *                                         # NOT RESET
     -PIPEVS *                                         # AND NOT VERTICAL SYNC
      BOT4 * -BOT3 *  BOT2 *  BOT1 *  BOT0 # AND BOTTOM EDGE VALUE IS 23

GOTO W55                           # THEN GOTO W55 WHICH KEEPS THE
                                   # DIALOG ENABLE SIGNAL ON FOR 10 LINES

ON                                 # IF IT IS
     -VRESET *                                         # NOT RESET
     -PIPEVS *                                         # AND NOT VERTICAL SYNC
      BOT4 *  BOT3 * -BOT2 * -BOT1 * -BOT0 # AND BOTTOM EDGE VALUE IS 24

GOTO W56                           # THEN GOTO W56 WHICH KEEPS THE
                                   # DIALOG ENABLE SIGNAL ON FOR 9 LINES

ON                                 # IF IT IS
     -VRESET *                                         # NOT RESET
     -PIPEVS *                                         # AND NOT VERTICAL SYNC
      BOT4 *  BOT3 * -BOT2 * -BOT1 *  BOT0 # AND BOTTOM EDGE VALUE IS 25

GOTO W57                           # THEN GOTO W57 WHICH KEEPS THE
                                   # DIALOG ENABLE SIGNAL ON FOR 8 LINES

ON                                 # IF IT IS
     -VRESET *                                         # NOT RESET
     -PIPEVS *                                         # AND NOT VERTICAL SYNC
      BOT4 *  BOT3 * -BOT2 *  BOT1 * -BOT0 # AND BOTTOM EDGE VALUE IS 26

GOTO W58                           # THEN GOTO W58 WHICH KEEPS THE
                                   # DIALOG ENABLE SIGNAL ON FOR 7 LINES

ON                                 # IF IT IS
     -VRESET *                                         # NOT RESET
     -PIPEVS *                                         # AND NOT VERTICAL SYNC
      BOT4 *  BOT3 * -BOT2 *  BOT1 *  BOT0 # AND BOTTOM EDGE VALUE IS 27

GOTO W59                           # THEN GOTO W59 WHICH KEEPS THE
                                   # DIALOG ENABLE SIGNAL ON FOR 6 LINES
```

```
ON                            # IF IT IS
      -VRESET *                                    # NOT RESET
      -PIPEVS *                                    # AND NOT VERTICAL SYNC
       BOT4 *  BOT3 *  BOT2 * -BOT1 * -BOT0 # AND BOTTOM EDGE VALUE IS 28

GOTO W60                      # THEN GOTO W60 WHICH KEEPS THE
                              # DIALOG ENABLE SIGNAL ON FOR 5 LINES

ON                            # IF IT IS
      -VRESET *                                    # NOT RESET
      -PIPEVS *                                    # AND NOT VERTICAL SYNC
       BOT4 *  BOT3 *  BOT2 * -BOT1 *  BOT0 # AND BOTTOM EDGE VALUE IS 29

GOTO W61                      # THEN GOTO W61 WHICH KEEPS THE

                              # DIALOG ENABLE SIGNAL ON FOR 4 LINES

ON                            # IF IT IS
      -VRESET *                                    # NOT RESET
      -PIPEVS *                                    # AND NOT VERTICAL SYNC
       BOT4 *  BOT3 *  BOT2 *  BOT1 * -BOT0 # AND BOTTOM EDGE VALUE IS 30

GOTO W62                      # THEN GOTO W62 WHICH KEEPS THE
                              # DIALOG ENABLE SIGNAL ON FOR 3 LINES

ON                            # IF IT IS
      -VRESET *                                    # NOT RESET
      -PIPEVS *                                    # AND NOT VERTICAL SYNC
       BOT4 *  BOT3 *  BOT2 *  BOT1 *  BOT0 # AND BOTTOM EDGE VALUE IS 31

GOTO W63                      # THEN GOTO W63 WHICH KEEPS THE
                              # DIALOG ENABLE SIGNAL ON FOR 2 LINES

#*******************************************************************

STATE W33 100001

ON   VRESET + PIPEVS          # VRESET OR VERTICAL SYNC RESETS
GOTO W0

ON  -VRESET * -PIPEVS         # NEXT STATE IF NOT RESET AND NOT VSYNC
GOTO W34

#*******************************************************************

STATE W34 100010

ON   VRESET + PIPEVS          # VRESET OR VERTICAL SYNC RESETS
GOTO W0

ON  -VRESET * -PIPEVS         # NEXT STATE IF NOT RESET AND NOT VSYNC
GOTO W35

#*******************************************************************

STATE W35 100011

ON   VRESET + PIPEVS          # VRESET OR VERTICAL SYNC RESETS
GOTO W0
```

```
ON  -VRESET * -PIPEVS      # NEXT STATE IF NOT RESET AND NOT VSYNC
GOTO W36

#*****************************************************************

STATE W36 100100

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W37

#*****************************************************************

STATE W37 100101

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W38

#*****************************************************************

STATE W38 100110

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W39

#*****************************************************************

STATE W39 100111

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W40

#*****************************************************************

STATE W40 101000

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W41

#*****************************************************************

STATE W41 101001

ON   VRESET + PIPEVS       # VRESET OR VERTICAL SYNC RESETS
GOTO W0
```

```
ON  -VRESET * -PIPEVS     # NEXT STATE IF NOT RESET AND NOT VSYNC
GOTO W42

#*****************************************************************

STATE W42 101010

ON   VRESET + PIPEVS      # VRESET OR VERTICAL SYNC RESETS
GOTO W0

ON  -VRESET * -PIPEVS     # NEXT STATE IF NOT RESET AND NOT VSYNC
GOTO W43

#*****************************************************************

STATE W43 101011

ON   VRESET + PIPEVS      # VRESET OR VERTICAL SYNC RESETS
GOTO W0

ON  -VRESET * -PIPEVS     # NEXT STATE IF NOT RESET AND NOT VSYNC
GOTO W44

#*****************************************************************

STATE W44 101100

ON   VRESET + PIPEVS      # VRESET OR VERTICAL SYNC RESETS
GOTO W0

ON  -VRESET * -PIPEVS     # NEXT STATE IF NOT RESET AND NOT VSYNC
GOTO W45

#*****************************************************************

STATE W45 101101

ON   VRESET + PIPEVS      # VRESET OR VERTICAL SYNC RESETS
GOTO W0

ON  -VRESET * -PIPEVS     # NEXT STATE IF NOT RESET AND NOT VSYNC
GOTO W46

#*****************************************************************

STATE W46 101110

ON   VRESET + PIPEVS      # VRESET OR VERTICAL SYNC RESETS
GOTO W0

ON  -VRESET * -PIPEVS     # NEXT STATE IF NOT RESET AND NOT VSYNC
GOTO W47

#*****************************************************************

STATE W47 101111

ON   VRESET + PIPEVS      # VRESET OR VERTICAL SYNC RESETS
GOTO W0
```

```
ON  -VRESET * -PIPEVS      # NEXT STATE IF NOT RESET AND NOT VSYNC
GOTO W48
#*****************************************************************

STATE W48 110000

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W49

#*****************************************************************

STATE W49 110001

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W50

#*****************************************************************

STATE W50 110010

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W51

#*****************************************************************

STATE W51 110011

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W52
#*****************************************************************
STATE W52 110100

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W53
#*****************************************************************
STATE W53 110101

ON   VRESET + PIPEVS       # VRESET OR VERTICAL SYNC RESETS
GOTO W0
ON  -VRESET * -PIPEVS      # NEXT STATE IF NOT RESET AND NOT VSYNC
GOTO W54
#*****************************************************************
```

```
STATE W54 110110

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W55

#******************************************************************

STATE W55 110111

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W56

#******************************************************************

STATE W56 111000

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W57

#******************************************************************

STATE W57 111001

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W58

#******************************************************************

STATE W58 111010

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W59

#******************************************************************
STATE W59 111011

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W60

#********************************************************************
```

```
STATE W60 111100

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W61

#*****************************************************************

STATE W61 111101

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W62

#*****************************************************************

STATE W62 111110

ON   VRESET + PIPEVS       # VRESET OR VERTICAL SYNC RESETS
GOTO W0

ON  -VRESET * -PIPEVS      # NEXT STATE IF NOT RESET AND NOT VSYNC
GOTO W63

#*****************************************************************

STATE W63 111111

   UGOTO W0                # AND NOW BACK TO 0 SINCE WE ARE OUT OF BITS
                           # THE CLOCKS PAL TAKES CARE OF WRAP AROUND

#*****************************************************************
```

The following is a schedule of fuse connections for the window or window shade PAL model 20R6 manufactured by Monolithic Memories, Inc.

WINDOW SHADE

```
               11 1111 1111 2222 2222 2233 3333 3333
   0123 4567 8901 2345 6789 0123 4567 8901 2345 6789

 0 0000 0000 0000 0000 0000 0000 0000 0000 0000 0000
 1 0000 0000 0000 0000 0000 0000 0000 0000 0000 0000
 2 0000 0000 0000 0000 0000 0000 0000 0000 0000 0000
 3 0000 0000 0000 0000 0000 0000 0000 0000 0000 0000
 4 0000 0000 0000 0000 0000 0000 0000 0000 0000 0000
 5 0000 0000 0000 0000 0000 0000 0000 0000 0000 0000
 6 0000 0000 0000 0000 0000 0000 0000 0000 0000 0000
 7 0000 0000 0000 0000 0000 0000 0000 0000 0000 0000

 8 ---- ---- ---- ---- ---- ---- ---- ---- ---- ----
 9 ---- ---- --X- --X- --X- --X- --X- --X- ---X ----
10 XXXX XXXX XXXX XXXX XXXX XXXX XXXX XXXX XXXX XXXX
11 XXXX XXXX XXXX XXXX XXXX XXXX XXXX XXXX XXXX XXXX
12 XXXX XXXX XXXX XXXX XXXX XXXX XXXX XXXX XXXX XXXX
13 XXXX XXXX XXXX XXXX XXXX XXXX XXXX XXXX XXXX XXXX
14 XXXX XXXX XXXX XXXX XXXX XXXX XXXX XXXX XXXX XXXX
```

```
15 XXXX XXXX XXXX XXXX XXXX XXXX XXXX XXXX XXXX XXXX

16 X--- ---- --X- ---- ---- ---- ---- --X- --X- --X-
17 ---- ---- --X- ---X ---- ---- ---- ---- --X- --X-
18 ---- ---- --X- ---- ---X ---- ---- ---- --X- --X-
19 ---- ---- --X- ---- ---- ---X ---- ---- --X- --X-
20 ---- ---- --X- ---- ---- ---- ---X ---- --X- --X-
21 ---- ---- --X- ---- ---- ---- -X-- -X-X -XX- -XX-
22 ---- ---- --X- ---- ---- X--- ---- ---X --X- --X-
23 XXXX XXXX XXXX XXXX XXXX XXXX XXXX XXXX XXXX XXXX

24 ---- X--- --X- ---- --X- --X- --X- --X- --X- --X-
25 ---- ---- ---X --X- ---- ---- ---- ---- --X- --X-
26 ---- ---- --X- ---X ---- ---- ---- ---- --X- --X-
27 ---- ---- --X- ---- --X- --X- X-X- ---X --X- --X-
28 XXXX XXXX XXXX XXXX XXXX XXXX XXXX XXXX XXXX XXXX
29 XXXX XXXX XXXX XXXX XXXX XXXX XXXX XXXX XXXX XXXX
30 XXXX XXXX XXXX XXXX XXXX XXXX XXXX XXXX XXXX XXXX
31 XXXX XXXX XXXX XXXX XXXX XXXX XXXX XXXX XXXX XXXX

32 ---- ---- X-X- --X- ---- --X- --X- --X- --X- --X-
33 ---- ---- ---X ---X --X- ---- ---- ---- --X- --X-
34 ---- ---- --X- ---- ---X ---- ---- ---- --X- --X-
35 ---- ---- ---- --X- ---X ---- ---- ---- --X- --X-
36 ---- ---- --X- --X- ---- --X- --X- X--X --X- --X-
37 XXXX XXXX XXXX XXXX XXXX XXXX XXXX XXXX XXXX XXXX
38 XXXX XXXX XXXX XXXX XXXX XXXX XXXX XXXX XXXX XXXX
39 XXXX XXXX XXXX XXXX XXXX XXXX XXXX XXXX XXXX XXXX

40 ---- ---- --X- X-X- --X- ---- --X- --X- --X- --X-
41 ---- ---- ---X ---X ---X --X- ---- ---- --X- --X-
42 ---- ---- --X- ---- ---- ---X ---- ---- --X- --X-
43 ---- ---- ---- --X- ---- ---X ---- ---- --X- --X-
44 ---- ---- ---- ---- --X- ---X ---- ---- --X- --X-
45 ---- ---- --X- --X- --X- ---- --X- ---X X-X- --X-
46 XXXX XXXX XXXX XXXX XXXX XXXX XXXX XXXX XXXX XXXX
47 XXXX XXXX XXXX XXXX XXXX XXXX XXXX XXXX XXXX XXXX

48 ---- ---- --X- --X- X-X- --X- ---- --X- --X- --X-
49 ---- ---- ---X ---X ---X ---X --X- ---- --X- --X-
50 ---- ---- --X- ---- ---- ---- ---X ---- --X- --X-
51 ---- ---- ---- --X- ---- ---- ---X ---- --X- --X-
52 ---- ---- ---- ---- --X- ---- ---X ---- --X- --X-
53 ---- ---- ---- ---- ---- --X- ---X ---- --X- --X-
54 ---- ---- --X- --X- --X- --X- ---- ---X --X- X-X-
55 XXXX XXXX XXXX XXXX XXXX XXXX XXXX XXXX XXXX XXXX

56 ---- ---- ---X ---X ---X ---X ---X --X- --X- --X-
57 ---- ---- ---- --X- ---- ---- ---- ---X --X- --X-
58 ---- ---- ---- ---- --X- ---- ---- ---X --X- --X-
59 ---- ---- ---- ---- ---- --X- ---- ---X --X- --X-
60 ---- ---- ---- ---- ---- ---- --X- ---X --X- --X-
61 ---- ---- --X- ---- ---- ---- ---- ---X --X- --X-
62 XXXX XXXX XXXX XXXX XXXX XXXX XXXX XXXX XXXX XXXX
63 XXXX XXXX XXXX XXXX XXXX XXXX XXXX XXXX XXXX XXXX

64 XXXX XXXX XXXX XXXX XXXX XXXX XXXX XXXX XXXX XXXX
65 XXXX XXXX XXXX XXXX XXXX XXXX XXXX XXXX XXXX XXXX
```

```
66 XXXX XXXX XXXX XXXX XXXX XXXX XXXX XXXX XXXX XXXX
67 XXXX XXXX XXXX XXXX XXXX XXXX XXXX XXXX XXXX XXXX
68 XXXX XXXX XXXX XXXX XXXX XXXX XXXX XXXX XXXX XXXX
69 XXXX XXXX XXXX XXXX XXXX XXXX XXXX XXXX XXXX XXXX
70 XXXX XXXX XXXX XXXX XXXX XXXX XXXX XXXX XXXX XXXX
71 XXXX XXXX XXXX XXXX XXXX XXXX XXXX XXXX XXXX XXXX

72 0000 0000 0000 0000 0000 0000 0000 0000 0000 0000
73 0000 0000 0000 0000 0000 0000 0000 0000 0000 0000
74 0000 0000 0000 0000 0000 0000 0000 0000 0000 0000
75 0000 0000 0000 0000 0000 0000 0000 0000 0000 0000
76 0000 0000 0000 0000 0000 0000 0000 0000 0000 0000
77 0000 0000 0000 0000 0000 0000 0000 0000 0000 0000
78 0000 0000 0000 0000 0000 0000 0000 0000 0000 0000
79 0000 0000 0000 0000 0000 0000 0000 0000 0000 0000


LEGEND:  X : FUSE NOT BLOWN (L,N,0)    - : FUSE BLOWN    (H,P,1)
         0 : PHANTOM FUSE   (L,N,0)    0 : PHANTOM FUSE  (H,P,1)

NUMBER OF FUSES BLOW = 1285
```

Starting at line 16, successive sections refer to WIN0, WIN1, WIN2, WIN3, WIN4 and DIAENB.

It will be noted from the foregoing that control of the number of lines of alphanumeric characters written on the screen of the terminal is accomplished with a minimum of interference with the overall operation of the terminal, being responsive to a single data word.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. Apparatus for providing a variable size and position alphanumeric area for a display screen normally supplied with alphanumeric information in the form of a plurality of consecutive lines positioned at consecutive locations, wherein said alphanumeric area normally consists of a lesser number of lines than said plurality of consecutive lines and constituting a subset of said plurality of consecutive lines, said apparatus comprising:

first means for selectively providing numerical identification of the starting line and the stopping line of a group of lines comprising said subset to be displayed, said numerical indication being in the form of a line of data from an input data bus, and a counter adapted to receive the numerical identification of the starting line for counting during the normal occurrence of said plurality of lines as said alphanumeric information is received until said starting line is reached to produce a display enabling signal to enable display of said alphanumeric information and adapted for counting until the stopping line is reached for discontinuing said enabling signal for disabling display of said alphanumeric information.

2. The apparatus according to claim 1 wherein said first means comprises an input latch for receiving said input information as a word from said input data bus.

3. The method of displaying a group of lines from a plurality of lines of alphanumeric character information selected for display on a display means, wherein said plurality of lines of alphanumeric character information are normally provided as input to said display means, and the lines of said group for display are fewer in number than said plurality of lines, comprising the steps of:

receiving data for the display as lines of alphanumeric information, storing a first numerical indication of a first line of said group of lines to be displayed on said display means, storing a second numerical indication of a last line of said group of lines to be displayed on said display means, counting lines provided to said display means until said first numerical indication is reached and thereupon enabling said data for display as lines of alphanumeric information, and counting the number of lines displayed until said second numerical indication is reached and thereupon disabling said data for disabling display of said lines of alphanumeric information.

4. The method according to claim 3 including receiving said first and second numerical indications as a word of data provided to said display means.

5. The method according to claim 4 wherein said counting includes generating a plurality of states representative of lines of alphanumeric information normally presented to said display means including a first plurality of states before the enabling of said display and a second plurality of states following enabling of said display, wherein a jump to a first state is made in response to the first numerical indication, leaving a predetermined number of states before enablement of said display, and a jump is made to a second state responsive to said second numerical indication after enablement of said display, leaving a number of states representative of the number of lines to be enabled on said display before disablement of said display.

6. Apparatus for providing a variable size and position alphanumeric area for a display screen normally supplied with alphanumeric information in the form of a plurality of consecutive lines positioned at consecutive locations, wherein said alphanumeric area normally consists of a lesser number of lines than said plurality of consecutive lines and constituting a subset of said plurality of consecutive lines, said apparatus comprising:

first means for selectively providing numerical identification of the starting line and the stopping line of a group of lines comprising said subset to be displayed, and a counter adapted to receive the numerical identification of the starting line for counting during the normal occurrence of said plurality of lines until said starting line is reached to produce a display enabling signal and adapted for counting until the stopping line is reached for discontinuing said enabling signal, wherein said counter comprises a state machine adapted to be shifted to consecutive states by a clock responsive to the occurrence of successive lines of alphanumeric information.

7. The apparatus according to claim 6 wherein said clock is provided by a second state machine, said second state machine being responsive to an alphanumeric line indicating signal as well as horizontal and vertical sync signals associated with the display screen to provide said clock when said line indicating signal and said horizontal sync signals coincide outside vertical retrace time.

8. The method of displaying a group of lines selected for display on a display means from among a plurality of lines of alphanumeric character information provided to said display means, comprising the steps of:

receiving a plurality of lines of alphanumeric character information, receiving a data input for identifying said group of lines among said plurality of lines, and in response to said data input causing said display means to be enabled for the portrayal of alphanumeric character information only during times when lines are received that are identified by said data input.

9. The method according to claim 8 wherein said data input is received as a data word indentifying the first and the last of the lines of said group of lines selected for display.

10. The method according to claim 8 including generating a first plurality of states corresponding to lines of alphanumeric information that are not displayed, and generating a second plurality of states corresponding to lines of information that are displayed, wherein enablement of the portrayal of alphanumeric character information is responsive to an indication of said second plurality of states.

11. The method according to claim 10 wherein said data input identifies the beginning and ending of said selected group of lines, the starting state of said first plurality of states being responsive to the identification of the beginning of said selected group of lines, and the starting state of said second plurality of states being responsive to the identification of the ending of said selected group of lines.

* * * * *